US008908356B2

(12) United States Patent
Wang

(10) Patent No.: US 8,908,356 B2
(45) Date of Patent: Dec. 9, 2014

(54) ELECTRICAL CABINET

(71) Applicant: Xuejun James Wang, San Ramon, CA (US)

(72) Inventor: Xuejun James Wang, San Ramon, CA (US)

(*) Notice: Subject to any disclaimer, the term of this patent is extended or adjusted under 35 U.S.C. 154(b) by 195 days.

(21) Appl. No.: 13/710,739

(22) Filed: Dec. 11, 2012

(65) Prior Publication Data

US 2013/0279085 A1 Oct. 24, 2013

Related U.S. Application Data

(60) Provisional application No. 61/637,796, filed on Apr. 24, 2012.

(51) Int. Cl.
*H02B 1/04* (2006.01)
*H01H 85/20* (2006.01)
*H02B 1/32* (2006.01)
*H02B 1/18* (2006.01)
*H02B 1/26* (2006.01)

(52) U.S. Cl.
CPC ............... *H02B 1/04* (2013.01); *H01H 85/20* (2013.01); *H02B 1/18* (2013.01); *H02B 1/32* (2013.01)
USPC .......... 361/642; 361/616; 361/626; 361/648; 361/807; 361/833; 174/50; 174/520; 340/635; 307/43

(58) Field of Classification Search
CPC .............. H02B 1/04; H02B 1/00; H02B 1/18; H02B 1/21; H02B 1/26; H02B 13/02; H01H 85/20; H01H 85/2045; H01H 85/205
USPC ........... 361/600, 601, 611, 622, 624, 629, 62, 361/63, 616, 630, 637, 641–648, 807, 809, 361/833, 834, 837; 174/50, 5 R, 208, 59, 174/520; 340/635, 636.1, 636.12; 307/43
See application file for complete search history.

(56) References Cited

U.S. PATENT DOCUMENTS

| | | | | | |
|---|---|---|---|---|---|
| 1,564,778 | A | * | 12/1925 | Gross et al. | 361/646 |
| 1,981,929 | A | * | 11/1934 | Starrett | 361/650 |
| 3,176,194 | A | * | 3/1965 | Williams, Jr. | 361/629 |
| 3,335,329 | A | * | 8/1967 | Ericson | 361/642 |
| 3,633,075 | A | * | 1/1972 | Hawkins | 361/616 |
| 4,233,643 | A | * | 11/1980 | Iverson et al. | 361/616 |
| 6,530,811 | B1 | * | 3/2003 | Padulo et al. | 439/716 |
| 6,560,123 | B1 | * | 5/2003 | de Varennes et al. | 361/807 |
| 2008/0158788 | A1 | * | 7/2008 | Darr et al. | 361/647 |
| 2011/0121984 | A1 | * | 5/2011 | Schripsema | 340/635 |
| 2011/0273015 | A1 | * | 11/2011 | Adest et al. | 307/43 |

* cited by examiner

Primary Examiner — Michail V Datskovskiy
(74) Attorney, Agent, or Firm — DLA Piper LLP (US)

(57) ABSTRACT

An electrical cabinet for housing and interconnecting photovoltaic BOS components can include a plurality of busbars and adjustable fuse mounts to allow for integration of BOS components in a compact space. The cabinet may comprises a base, a busbar mounted on the base, a plurality of standoff devices, and a cover containing the base, the busbar, and the standoff devices. The standoff devices are spaced apart from the busbar. Each standoff device includes a standoff member slideably mounted on the base.

20 Claims, 18 Drawing Sheets

| PARAMETER NAME | | UNITS | PARAMETER VALUE | |
| --- | --- | --- | --- | --- |
| | | | AC | DC |
| Main circuit rated voltage | | V | 480 | 1000 |
| Auxiliary circuit rated voltage | | V | 220 | 24 |
| Insulation voltage | Rated insulation voltage | V | 600 | 1000 |
| | 1min frequency withstand voltage | V | 2200 | 3400 |
| | Rated impulse withstand voltage (1.2/50μs) | kV | 6 | 12 |
| Rated frequency | | HZ | 50~60 | |
| Rated working current (IP45) | | A | ≤800 | ≤1000 |
| Rated short-time withstand current (RMS 1s) | | kA | 15 | |
| Rated peak withstand current (peak 0.1s) | | kA | 30 | |
| Rated current per DC input channel: | | A | | 100, 200 |
| DC Input channel: | | | | 6 loops, 8 loops, 10 loops, 12 loops, 16 loops, 20 loops |
| Protection class | | | IP45 | |
| Temperature range | | °C | -35~50 | |
| Altitude | | m | 3200 | |
| Humidity | | | 50% at 50 | |
| Size(H x W x D) | | mm | 2025x1200x1000 | |

FIG. 16

ELECTRICAL CABINET

CROSS-REFERENCE TO RELATED APPLICATION

This application claims the benefit of U.S. Provisional Application No. 61/637,796, filed Apr. 24, 2012, which is incorporated herein by reference.

FIELD OF THE INVENTION

This invention relates generally to an electrical cabinet and, more particularly, an electrical cabinet for a photovoltaic system.

BACKGROUND OF THE INVENTION

A photovoltaic system include solar panels. The remaining electrical components of the system are commonly referred to as balance of system (BOS) components. BOS components include any combination of DC combiner boxes, DC disconnect switches, cables, an inverter, AC disconnect switches, and transformers. These BOS components are typically standalone and discreet products due to the fact that electrical specifications of one photovoltaic system is rarely identical to that of another system, which means that BOS components differ from one photovoltaic system to another. Standalone and discrete BOS components must be interconnected with many cables, which involves hours of configuration and installation labor. Standalone and discrete BOS components also take up much space which may be limited or unavailable for some projects.

What is needed is a way to integrate BOS components to reduce labor costs and square footage occupied by BOS components, while allowing flexibility in the use of a large variety of commercially available BOS components having different form factors, sizes, and electrical ratings.

SUMMARY OF THE INVENTION

Briefly and in general terms, the present invention is directed an electrical cabinet.

In aspects of the present invention, an electrical cabinet comprises a base, a busbar mounted on the base, a plurality of standoff devices spaced apart from the busbar, each standoff device including a standoff member slideably mounted on the base and a fuse connection terminal, each fuse connection terminal spaced apart from the other fuse connection terminals. The cabinet further comprises a cover containing the base, the busbar, and the standoff devices.

A cabinet according to any one of the above aspects, wherein each standoff member includes a foot portion abutting the base, each standoff device further includes a retainer having body portion and a shoulder portion connected to and wider than the body portion, the body portion extends through the base and connects the shoulder portion to the foot portion, and the body portion is configured to allow movement of the shoulder portion toward or away from the base.

A cabinet according to any one of the above aspects, wherein each standoff device includes a threaded member connecting the retainer to the foot portion of the standoff member, the threaded member is rotatable relative to the foot portion, and rotation of the threaded member in one direction causes the retainer to move toward or away from the foot portion.

A cabinet according to any one of the above aspects, wherein each fuse connection terminal includes a plurality of connection points, each connection point being a connection hole or a connection post.

A cabinet according to any one of the above aspects, wherein the base includes a plurality of slots, each slot holding one of the standoff members, the slots sized and oriented to allow the standoff members to move toward and away from the busbar.

A cabinet according to any one of the above aspects, wherein the busbar includes a plurality of connection holes or connection posts.

A cabinet according to any one of the above aspects, further comprising an invertor busbar contained within the cover, wherein all parts of the invertor busbar are spaced apart from the busbar.

A cabinet according to any one of the above aspects, further comprising an electrical switch assembly contained within the cover and configured to electrically connect the busbar to the invertor busbar.

A cabinet according to any one of the above aspects, further comprising switch lever having a handle and a coupling, the handle disposed outside the cover, the coupling connecting the handle to the switch assembly.

A cabinet according to any one of the above aspects, further comprising a second busbar mounted on the base, wherein the base includes a first row of slots and a second row of slots, each slot holding one of the standoff members, the slots sized and oriented to allow the standoff members to move toward and away from the first and second busbars, either one or both of the busbar and the second busbar being disposed between the first row of slots and a second row of slots.

A cabinet according to any one of the above aspects, further comprising a non-conductive plate disposed between the busbar and the second busbar.

A cabinet according to any one of the above aspects, further comprising an invertor busbar mounted to the base and a second invertor busbar mounted to the base, wherein within the cover, the busbar, second busbar, invertor busbar, and second invertor busbar are electrically isolated from each other.

A cabinet according to any one of the above aspects, wherein the base includes a front side and a rear side, wherein the busbar, the second busbar, and the fuse connection terminals of the standoff devices are located on the front side, and wherein the invertor busbar and the second invertor busbar are located on the rear side.

A cabinet according to any one of the above aspects, further comprising an electrical switch assembly contained within the cover, the switch assembly configured to simultaneously electrically connect the busbar to the invertor busbar, electrically connect the second busbar to the second invertor busbar, and electrically isolate the busbar and the invertor busbar from the second busbar and the second invertor busbar.

A cabinet according to any one of the above aspects, further comprising a neutral busbar and a second neutral busbar, both of which are contained within the cover, wherein within the cover, the busbar, the second busbar, the invertor busbar, the second invertor busbar, the neutral busbar, and the second neutral busbar are electrically isolated from each other.

A cabinet according to any one of the above aspects, wherein the neutral busbar includes a plurality of connection holes or connection posts, and the second neutral busbar includes a plurality of connection holes or connection posts.

A cabinet according to any one of the above aspects, further comprising an A-phase busbar, a B-phase busbar, and a C-phase busbar, all of which are contained within the cover and are electrically isolated from each other within the cover.

A cabinet according to any one of the above aspects, further comprising a second A-phase busbar, a second B-phase busbar, and a second C-phase busbar, all of which are contained within the cover and are electrically isolated from each other within the cover.

A cabinet according to any one of the above aspects, further comprising an AC switch assembly contained within the cover, the AC switch assembly configured to simultaneously electrically connect the A-phase busbar to the second A-phase busbar, electrically connect the B-phase busbar to the second B-phase busbar, electrically connect the C phase busbar to the second C-phase busbar, and keep the A-phase busbar, the B-phase busbar, and the C-phase busbar electrically isolated from each other.

A cabinet according to any one of the above aspects, further comprising an AC switch lever having a handle and a coupling, the handle disposed outside the cover, the coupling connecting the handle to the AC switch assembly.

The features and advantages of the invention will be more readily understood from the following detailed description which should be read in conjunction with the accompanying drawings.

BRIEF DESCRIPTION OF THE DRAWINGS

FIG. 16 is a table of exemplary specifications for the configurations, assemblies, devices, and cabinets of FIGS. 1-15.

DETAILED DESCRIPTION OF EXEMPLARY EMBODIMENTS

As used herein, the phrase "electrically isolated" encompasses substantially isolated.

Any term of approximation such as, without limitation, "near," "about," "approximately," "substantially," "essentially" and the like mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the modified word or phrase. For example and without limitation, a first element that is described as "substantially isolated" from a second element encompasses a condition in which the first element is perfectly isolated electrically from the second element and a condition that one skilled in the art would readily recognize as a condition in which the first element is isolated electrically from the second element although there may be insignificant leakage current between the first element and the second element.

Figure 1:
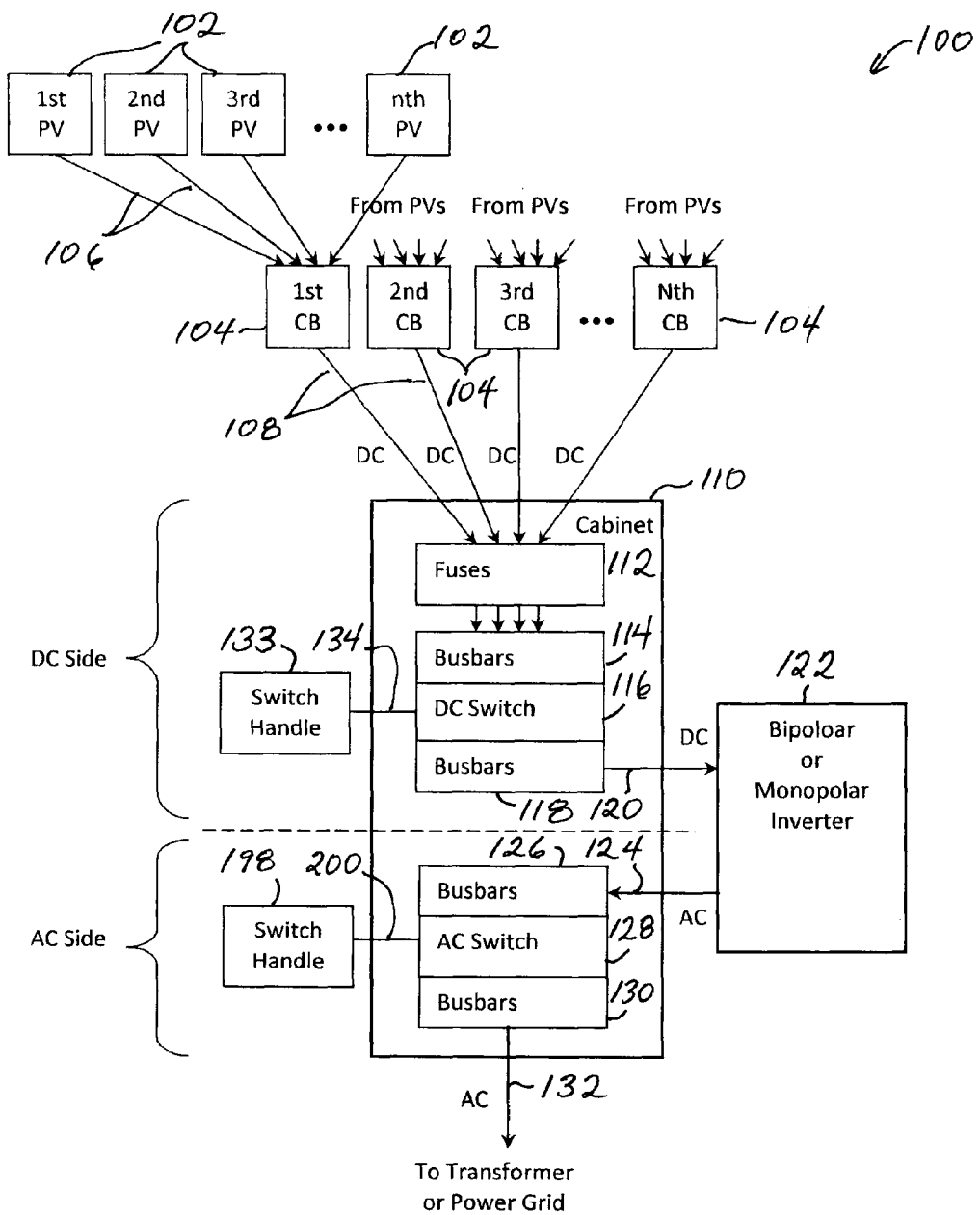
FIG. 1 is a block diagram of a photovoltaic system showing an electrical cabinet.

Referring now in more detail to the exemplary drawings for purposes of illustrating embodiments of the invention, wherein like reference numerals designate corresponding or like elements among the several views, there is shown in FIG. 1 an exemplary photovoltaic system 100. A plurality of photovoltaic panels 102, abbreviated PV and also known as solar panels, are electrically connected to combiner box 104, abbreviated CB. There can by any number, n, of photovoltaic panels connected to combiner box 104. Also, there can be any number, N, of combiner boxes 104 in system 100. Each combiner boxes 104 can be connected to the same or different number of photovoltaic panels 102 as other combiner boxes 104.

Electrical DC power from photovoltaic panels 102 is delivered by cables 106 to combiner boxes 104, and is then delivered by other cables 108 to cabinet 110. Cabinet 110 serves as a cover that provides safety and protection for fuses, switches and electrical connections associated with inverter 122, which converts DC power to AC power. The DC power from combiner boxes 104 passes through fuses 112, various busbars 114, 118, and DC switch 116, and is delivered via cable 120 to invertor 122. Invertor 122 returns AC power via cable 124 to cabinet 110, which then passes through various busbars 126, 130, and AC switch 128 before being delivered via cable 132 to a transformer or power grid.

Figure 2:
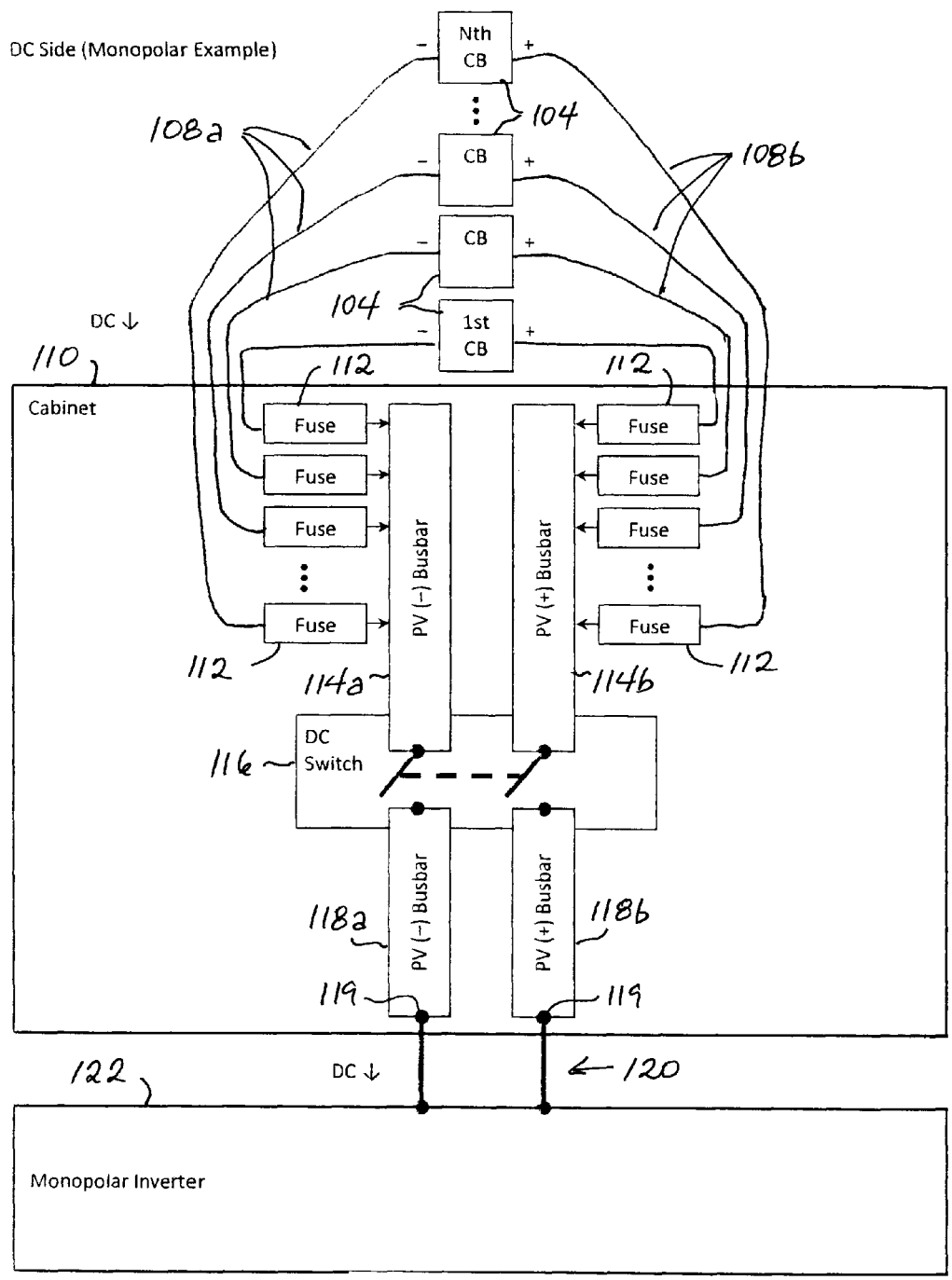
FIG. 2 is a block diagram of an exemplary configuration within a DC side of the electrical cabinet of FIG. 1.

FIG. 2 shows exemplary electrical connections for delivering DC power from combiner boxes 104 to invertor 122. The electrical connections are an example of a unipolar or monopolar configuration. Inverter 122 can be a unipolar- or monopolar-type invertor. DC power from the combiner boxes 104 are delivered through negative power lines 108a and positive power lines 108b of cables 108. Each positive and negative power line is connected to fuse 112 which is electrically connected to busbars 114a, 114b. A first group of fuses 112 connects negative power lines 108a to first busbar 114a. A second group of fuses 112 connects positive power lines 108b to second busbar 114b. First and second busbars 114a, 114b are electrically connected to switch assembly 116 while being electrically isolated from each other. Cable 120 delivers DC power to invertor 122 by electrically connecting invertor busbars 118a, 118b to invertor 122.

In some embodiments, cable 120 is replaced by DC busbars of invertor 122.

Each one of invertor busbars 118a, 118b optionally includes one or more connection points 119 for connecting to cable 120 or to DC busbars of invertor 122. Connection point 119 can be a connection post or a connection hole. A connection post can be a bolt or tab protruding from the body of invertor busbar 118a, 118b. A connection hole can be through hole, side cut, or perforation formed in the body of invertor busbar 118a, 118b.

Switch assembly 116 is configured to simultaneously connect first busbar 114a to first invertor busbar 118a and connect second busbar 114b to second invertor busbar 118b while keeping first busbar 114 and first invertor busbar 118a electrically isolated from second busbar 114b and second invertor busbar 118b. When switch assembly 116 is in an open state, first busbar 114a is electrically isolated from invertor busbar 118a, and second busbar 114b is electrically isolated from second invertor busbar 118b. Switch assembly 116 can be manually actuated by a person via a switch lever that includes handle 133 (FIG. 1) accessible from outside cabinet 110 and further includes coupling 134 that operatively connects handle 133 to switch assembly 116 inside cabinet 110.

Figure 3A:
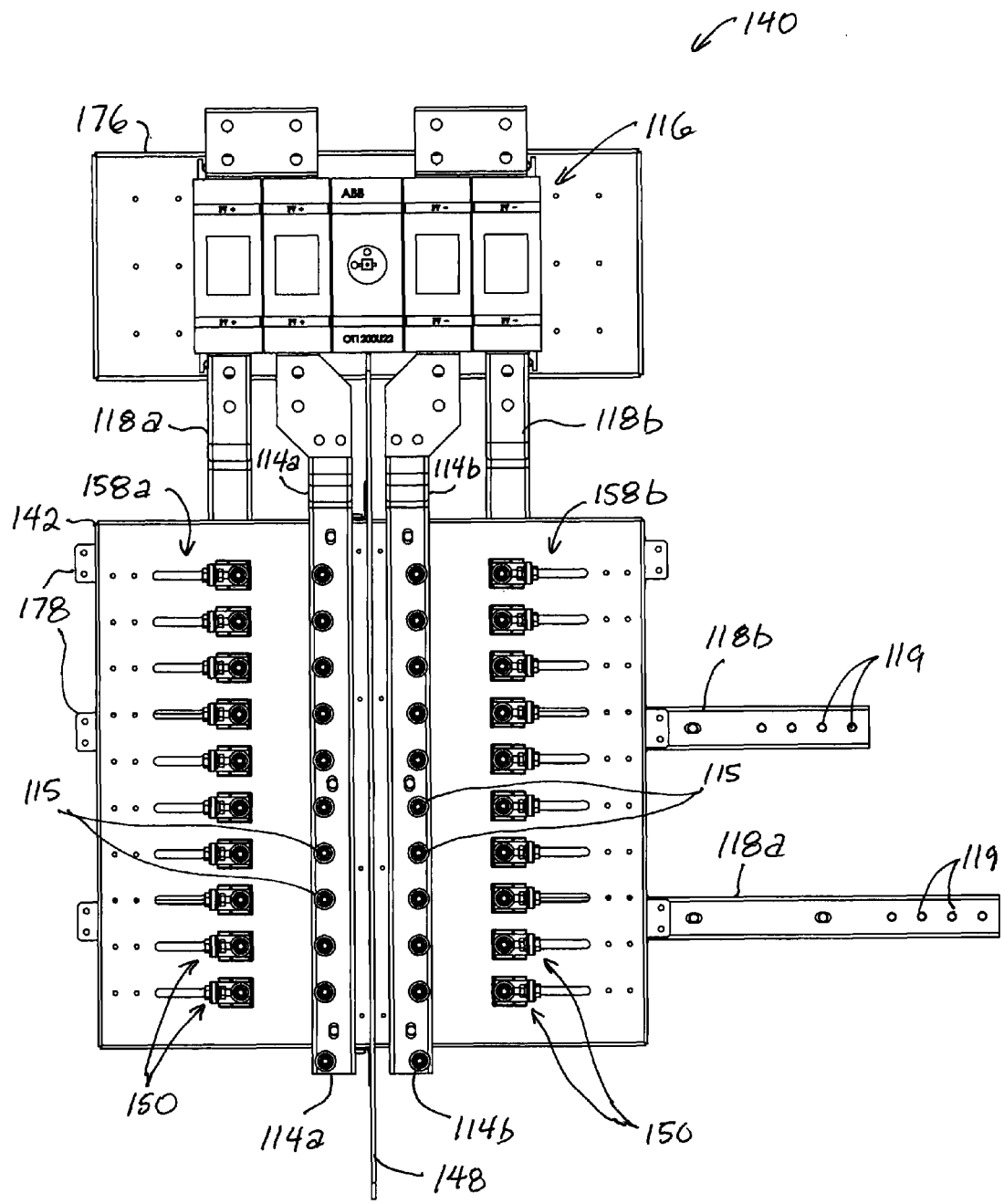
FIGS. 3A and 3B are front and perspective views of an exemplary DC busbar assembly within the electrical cabinet of FIG. 1 corresponding to the configuration of FIG. 2.
Figure 3B:
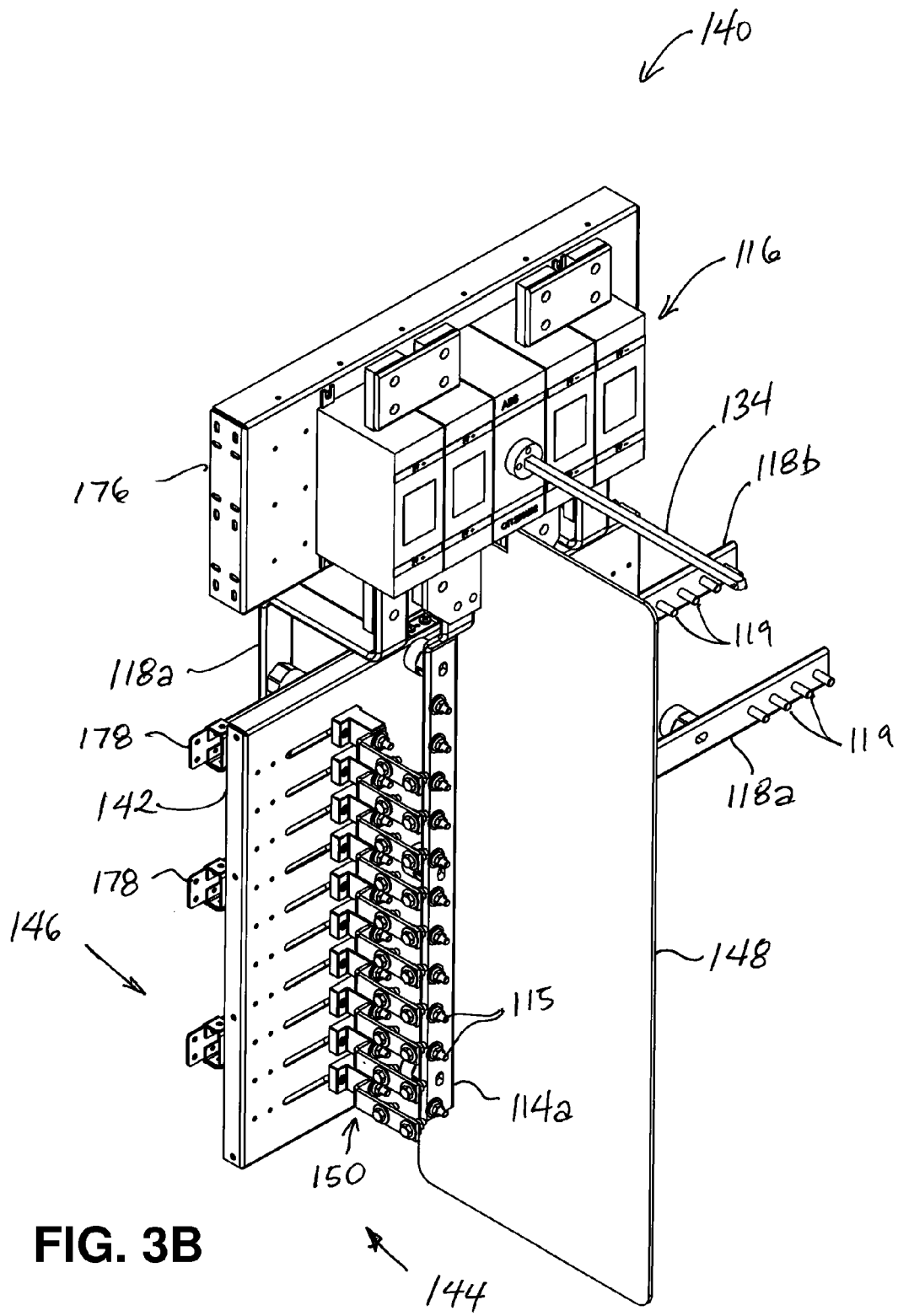

FIGS. 3A and 3B show exemplary DC busbar assembly 140 that can be implemented for the electrical connections of FIG. 2. An internal panel or base 142 stabilizes and secures DC busbar assembly 140 to cabinet 110. Base 142 of DC busbar assembly 140 has front side 144 and rear side 146. First busbar 114a and second busbar 114b are mounted on front side 144. Front side 144 is divided by non-conductive plate 148 disposed between first busbar 114a and second busbar 114b. First invertor busbar 118a and second invertor busbar 118b are mounted on rear side 146.

A plurality of standoff devices 150 are slideably mounted on base 142. Standoff devices 150 are a means for electrically connecting power lines of cables 108 to fuses 112 (see FIG. 2) which are not shown in FIGS. 3A to 4 for clarity. By being able to slide, standoff devices 150 allow a variety of fuses, having different sizes and ratings, to be mounted on the busbar assembly according to user preference and/or according to the electrical specifications of the photovoltaic system.

It will be appreciated that the path and bends of any one or more of busbars 114a, 114b, 118a, 118b may differ from what is shown in FIGS. 3A and 3B depending on the requirements of the user and/or the photovoltaic system.

Figure 4:
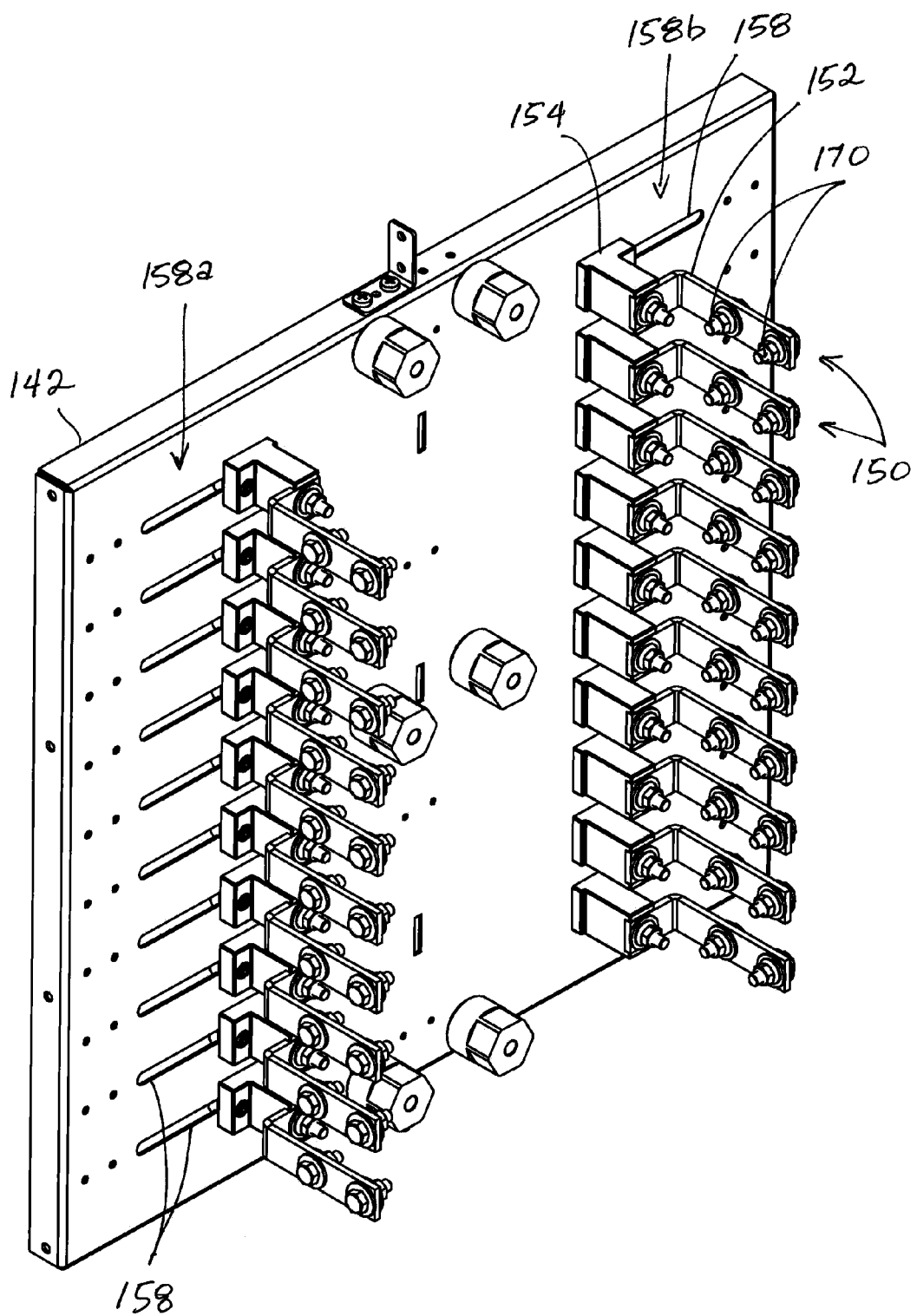
FIG. 4 is a perspective view of a portion of the DC busbar assembly showing a base and standoff devices for connecting and securing fuses to the busbar assembly.
Figure 5:
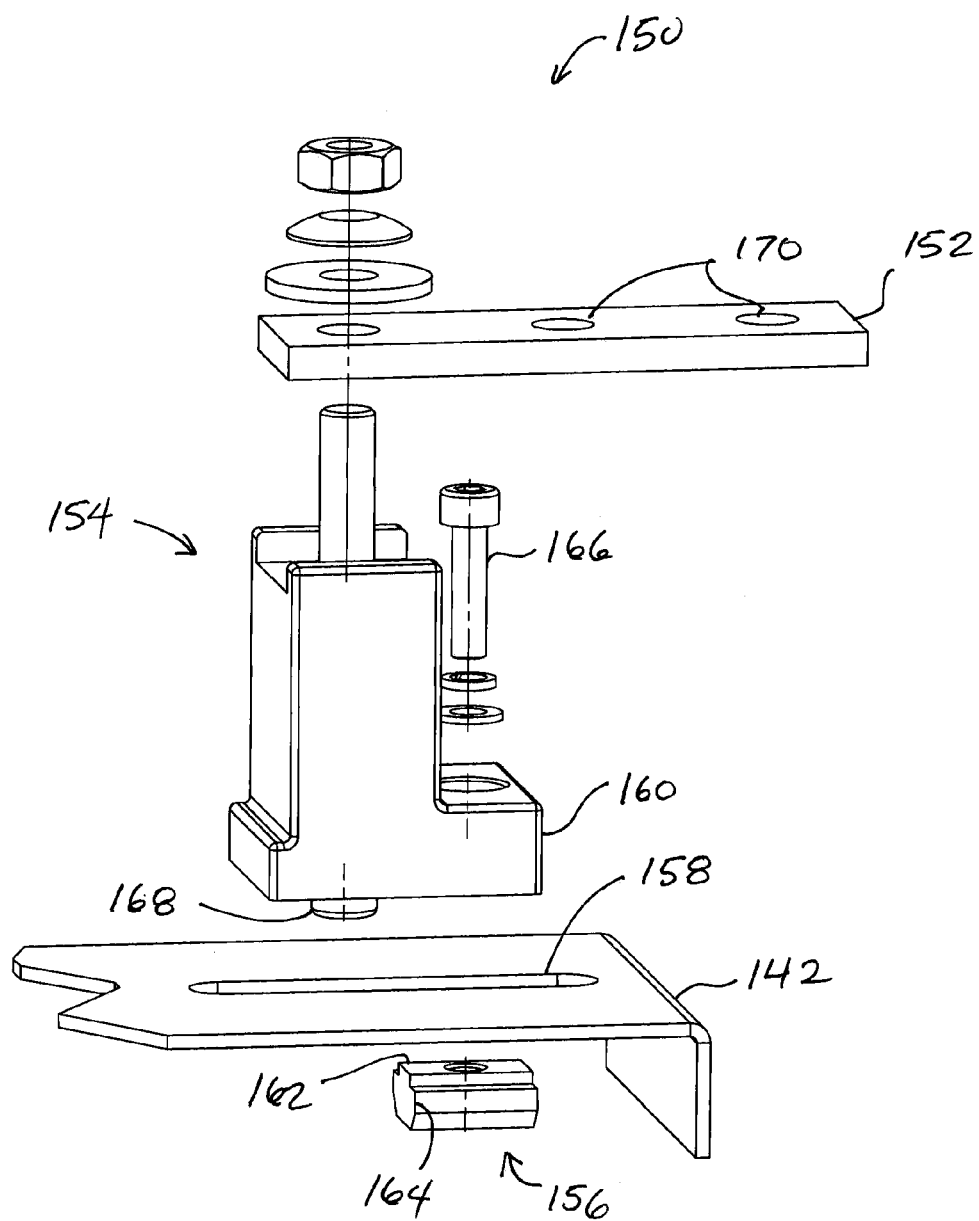
FIG. 5 is an exploded view of one of the standoff devices of FIG. 4 showing a fuse connection terminal.
Figure 6:
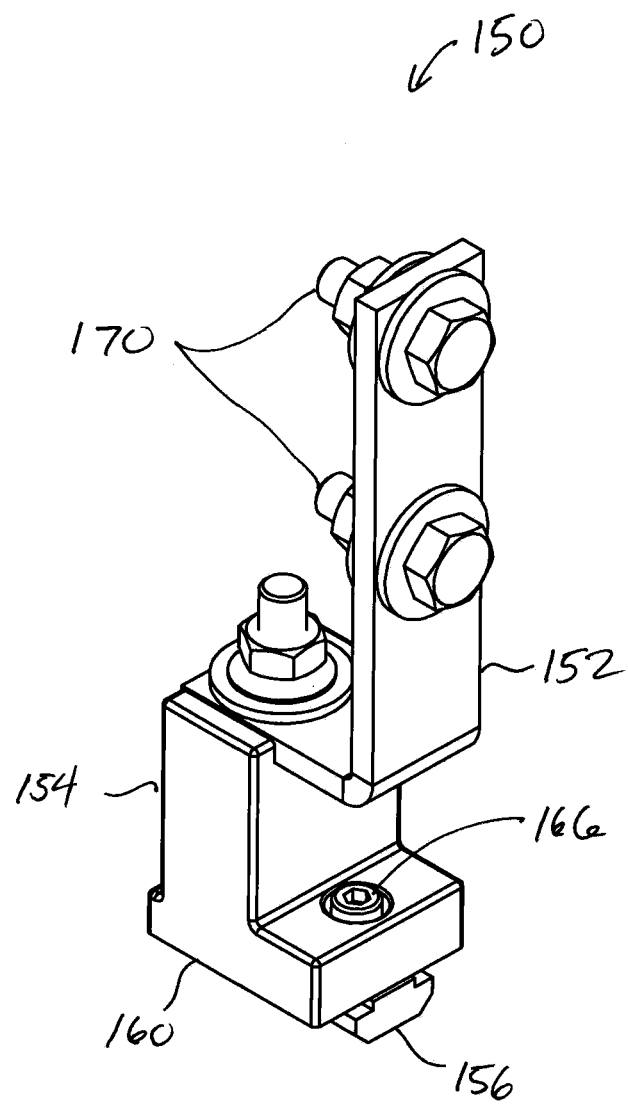
FIG. 6 is a perspective view of one of the standoff devices of FIG. 4 showing an alternative fuse connection terminal.

FIGS. 4 to 6 show base 142 and standoff devices 150 in greater detail. In FIG. 4, the busbars and non-conductive plate are omitted for clarity. Each standoff device 150 has fuse connection terminal 152 mounted on standoff member 154 that is mounted by retainer 156 (FIG. 5) on slot 158 formed through base 142. Each standoff device 150 has its own slot 158 that runs substantially parallel to other slots 152 that carry other standoff devices 150. Standoff member 154 is made of a high dielectric material that electrically insulates or isolates fuse connection terminal 152 from base 142 and other fuse connection terminals 152. Any dielectric material known in the art of power distribution may be used.

As shown in FIG. 5, each standoff member 154 includes a foot portion 160 which abuts base 142. Retainer includes body portion 162 and shoulder portion 164 connected to and wider than body portion 162. Body portion 162 fits within and extends through slot 158 of base 142 and connects shoulder portion 164 to foot portion 160 of standoff member 154. Shoulder portion 164 is wider than and incapable of passing through slot 158. Body portion 162 is configured to allow movement of shoulder portion 164 toward or away from base 142. Body portion 162 has hole 164 with helical threads that engage threaded member 166 that extends through foot portion 160. Threaded member 166 connects retainer 156 to foot portion 160 and is rotatable relative to foot portion 160. Rotation of threaded member 166 in one direction causes retainer 156 to move toward and press against based 142 or to move and loosen from base 142. Standoff device 150 is fixed to a stationary position when shoulder portion 164 of retainer 156 is clamped tightly against base 142. Standoff device 150 is slideable along the length of slot 158 when shoulder portion 164 is loosened from base 142. Alignment post 168 protrudes from and is fixed to the bottom of foot portion 160. Alignment post 168 enters slot 158 and prevents standoff member 154 from rotating relative to base 142.

Fuse connection terminal 152 is made of an electrically conductive material, such as a metal bar, and can be of any size and shape to accommodate the form factor of fuse 112 selected by the user. For example, fuse connection terminal 152 can be an L-shaped bar as shown in FIGS. 4 and 6 or a straight bar as shown in FIG. 5. Fuse connection terminal 152 has at least two electrical connection points 170. One electrical connection point 170 is connected to a power line of cable 108 from combiner box 104. The other electrical connection 170 point is connected to the terminal of fuse 112. Each electrical connection point 170 can be a connection post as shown in FIGS. 4 and 6 or a connection hole as shown in FIG. 5. A connection post can be a bolt or tab protruding from the body of fuse connection terminal 152. A connection hole can be through hole, side cut, or perforation formed in the body of fuse connection terminal 152.

Referring again to FIGS. 3A, 3B and 4, slots 158 are arranged in a first row 158a of slots and a second row 158b of slots. First and second busbars 114a, 114b are disposed between first row 158a and second row 158b. As previously mentioned a terminal of fuse 112 (FIG. 2) is connected to fuse connection terminal 152 of standoff device 150. The opposite terminal of fuse 112 (FIG. 2) is connected to first busbar 114a or second busbar 114b, depending on which side of non-conductive plate 148 the fuse is to be installed.

Each one of first busbar 114a and second busbar 114b includes a plurality of connection points 115 for electrically connecting to the opposite terminal of fuse 112. Each connection point 115 being a connection hole or a connection post. A connection post can be a bolt or tab protruding from the body of the busbar. A connection hole can be through hole, side cut, or perforation formed in the body of the busbar.

So that fuses of different lengths can be installed, slots 158 are sized and oriented to allow standoff members 154 to move toward and away from first and second busbars 114a, 114b. Slots 158 in first row 158a are substantially parallel to each other and are substantially perpendicular to first busbar 114a. Slots 158 in second row 158b are substantially parallel to each other and are substantially perpendicular to second busbar 114b.

As shown in FIGS. 3A and 3B, DC busbar assembly 140 includes base 176 for securing switch assembly 116 to cabinet 110, and support brackets 178 configured to keep invertor busbars 118a, 118b spaced apart and electrically isolated from each other.

Figure 7:
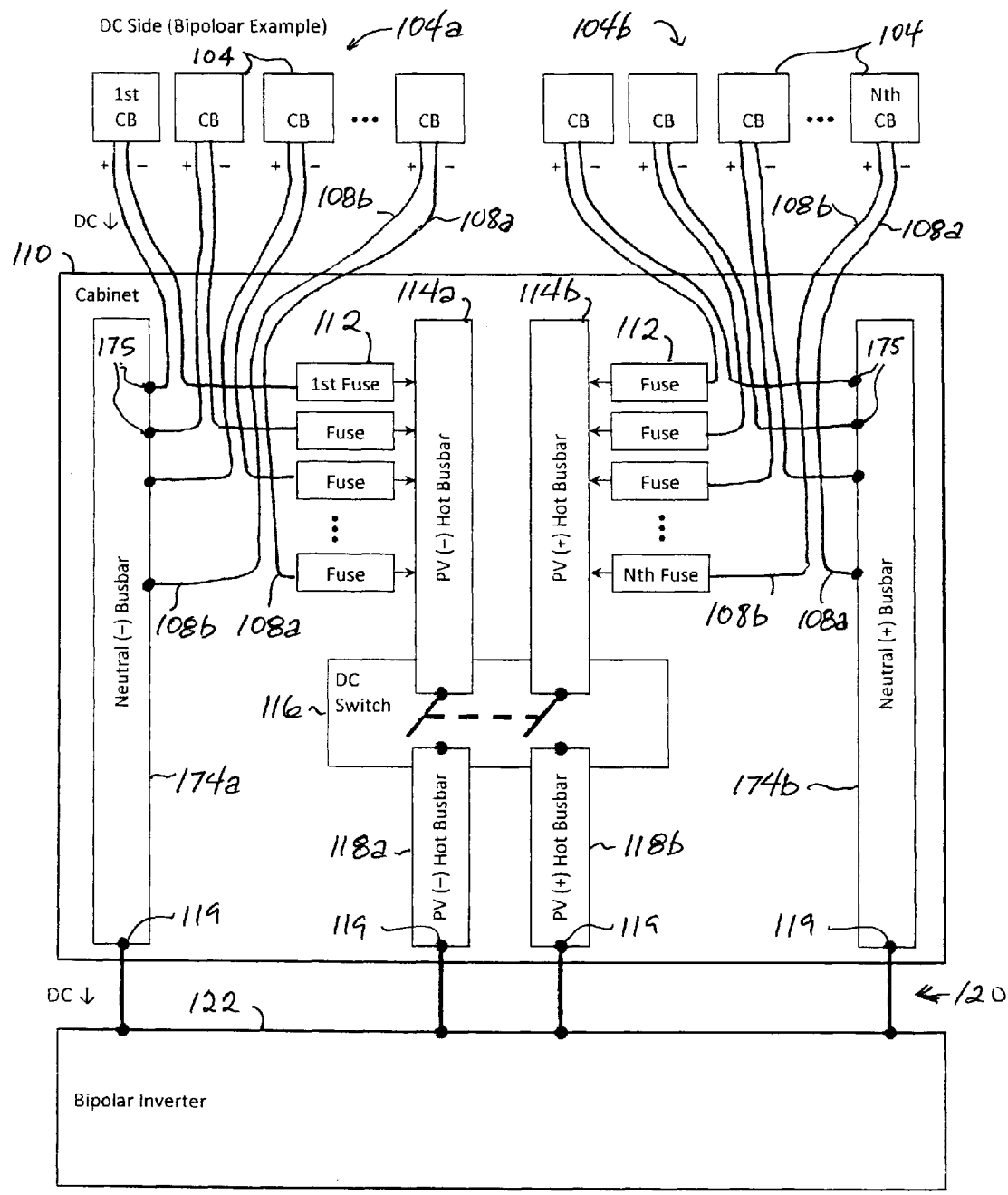
FIG. 7 is a block diagram of an alternative, exemplary configuration within the DC side of the electrical cabinet of FIG. 1.

FIG. 7 shows exemplary electrical connections for delivering DC power from combiner boxes 104 to invertor 122. The electrical connections are an example of a bipolar configuration. Inverter 122 can be a bipolar-type invertor. DC power from combiner boxes 104 are delivered through negative power lines 108a and positive power lines 108b of cables 108.

For a first group 104a of combiner boxes 104, negative power lines 108a are electrically connected via a first group of fuses 112 to first busbar 114a, and positive power lines 108b are electrically connected to first neutral busbar 174a.

For a second group 104b of combiner boxes 104, positive power lines 108b are electrically connected via a second group of fuses 112 to second busbar 114b, and negative power lines 108a are electrically connected to second neutral busbar 174b.

First and second busbars 114*a*, 114*b* are electrically connected to switch assembly 116 while being electrically isolated from each other. Cable 120 delivers DC power to invertor 122 by electrically connecting invertor busbars 118*a*, 118*b* and neutral busbars 174*a*, 174*b* to invertor 122.

Each one of invertor busbars 118*a*, 118*b* and neutral busbars 174*a*, 174*b* optionally includes connection points 119 for connecting to cable 120 or to DC busbars of invertor 122. Connection point 119 can be a connection post or a connection hole. A connection post can be a bolt or tab protruding from the body of the busbar. A connection hole can be through hole, side cut, or perforation formed in the body of the busbar.

Switch assembly 116 is configured to simultaneously electrically connect first busbar 114*a* to first invertor busbar 118*a* and electrically connect second busbar 114*b* to second invertor busbar 118*b* while keeping first busbar 114 and first invertor busbar 118*a* electrically isolated from second busbar 114*b* and second invertor busbar 118*b*. When switch assembly 116 is in an open state, first busbar 114*a* is electrically isolated from invertor busbar 118*a*, and second busbar 114*b* is electrically isolated from second invertor busbar 118*b*. Switch assembly 116 can be manually actuated by a person via a switch lever that includes handle 133 (FIG. 1) accessible from outside cabinet 110 and further including coupling 134 that operatively connects handle 133 to switch assembly 116 inside cabinet 110.

Figure 8A:
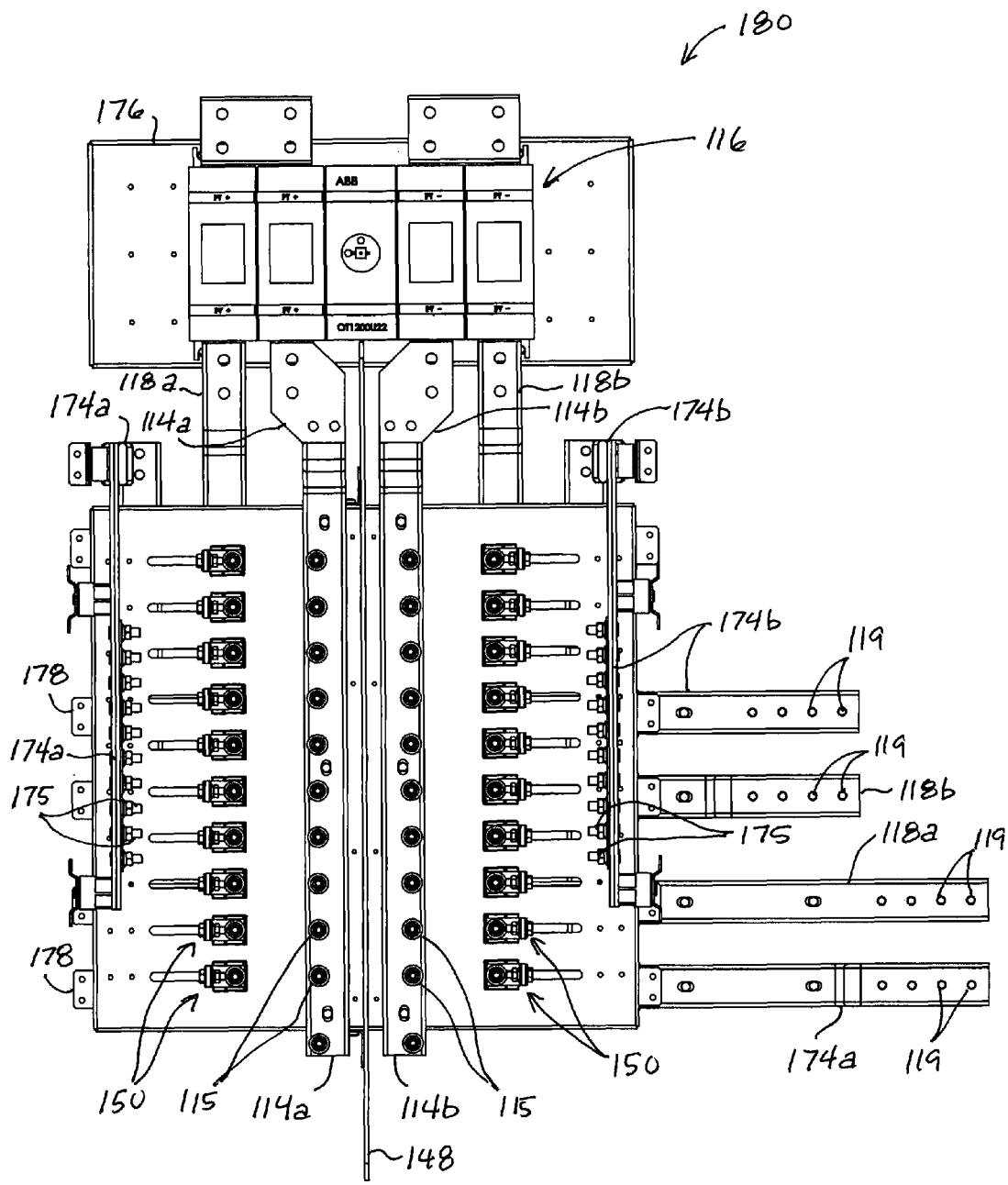
FIGS. 8A and 8B are front and perspective views of an exemplary DC busbar assembly within the electrical cabinet of FIG. 1 corresponding to the configuration of FIG. 7.
Figure 8B:
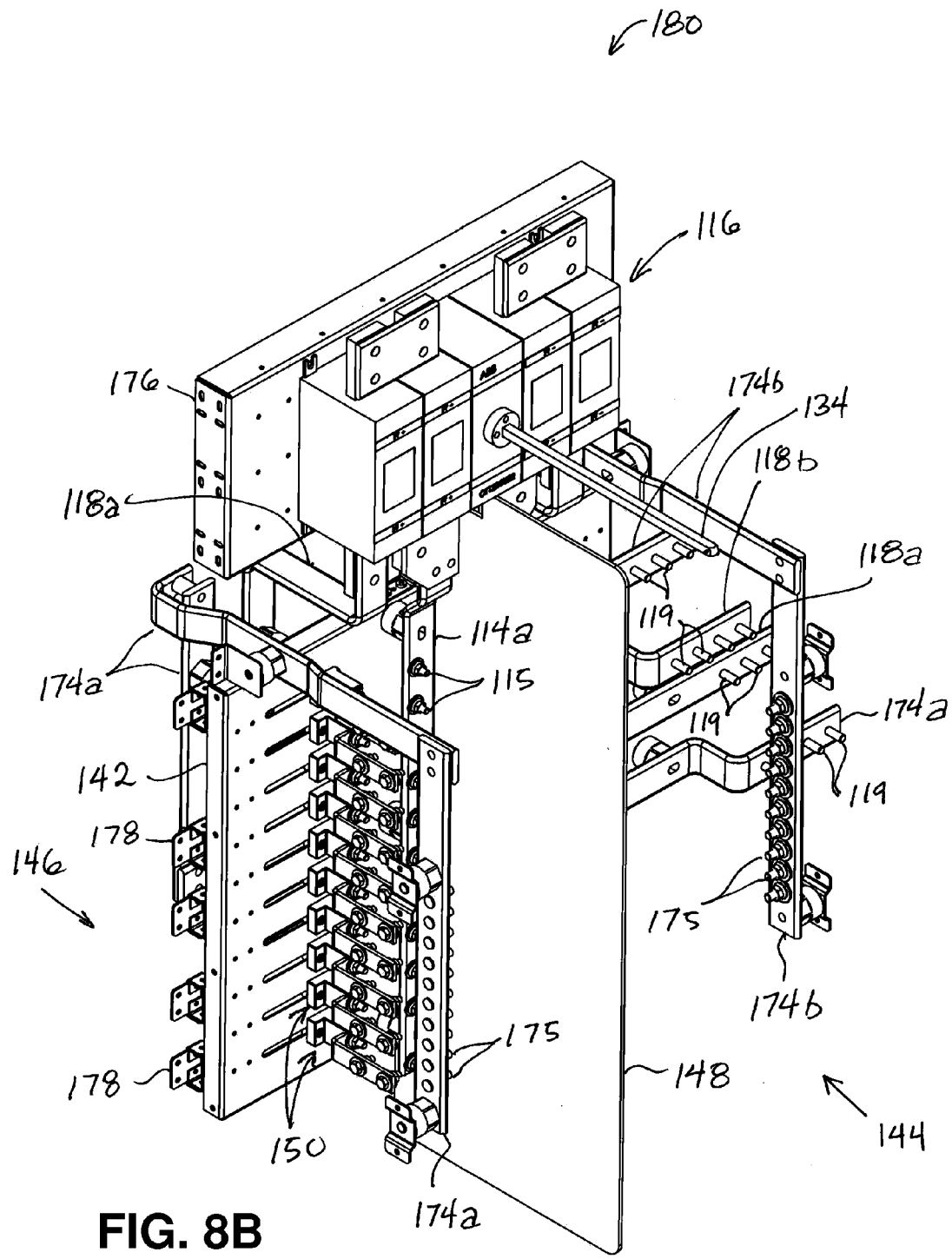

FIGS. 8A and 8B show exemplary DC busbar assembly 180 that can be implemented for the electrical connections of FIG. 7. DC busbar assembly 180 is the same as DC busbar assembly 140 with the addition of first neutral busbar 174*a* and second neutral busbar 174*b*. Standoff devices 150 of FIGS. 8A and 8B can be as shown and described in FIGS. 3A to 6.

Each one of first neutral busbar 174*a* and second neutral busbar 174*b* runs from front side 144 of base 142 to rear side 146 of base 142. Each one of first neutral busbar 174*a* and second neutral busbar 174*b* includes a plurality of connection points 175 for electrically connecting power lines of cable 108. Each connection point 175 can be a connection hole or a connection post. A connection post can be a bolt or tab protruding from the body of the neutral busbar. A connection hole can be through hole, side cut, or perforation formed in the body of the neutral busbar.

It will be appreciated that the path and bends of any one or more of busbars 114*a*, 114*b*, 118*a*, 118*b*, 174*a*, 174*b* may differ from what is shown in FIGS. 8A and 8B depending on the requirements of the user and/or the photovoltaic system.

Figure 9:
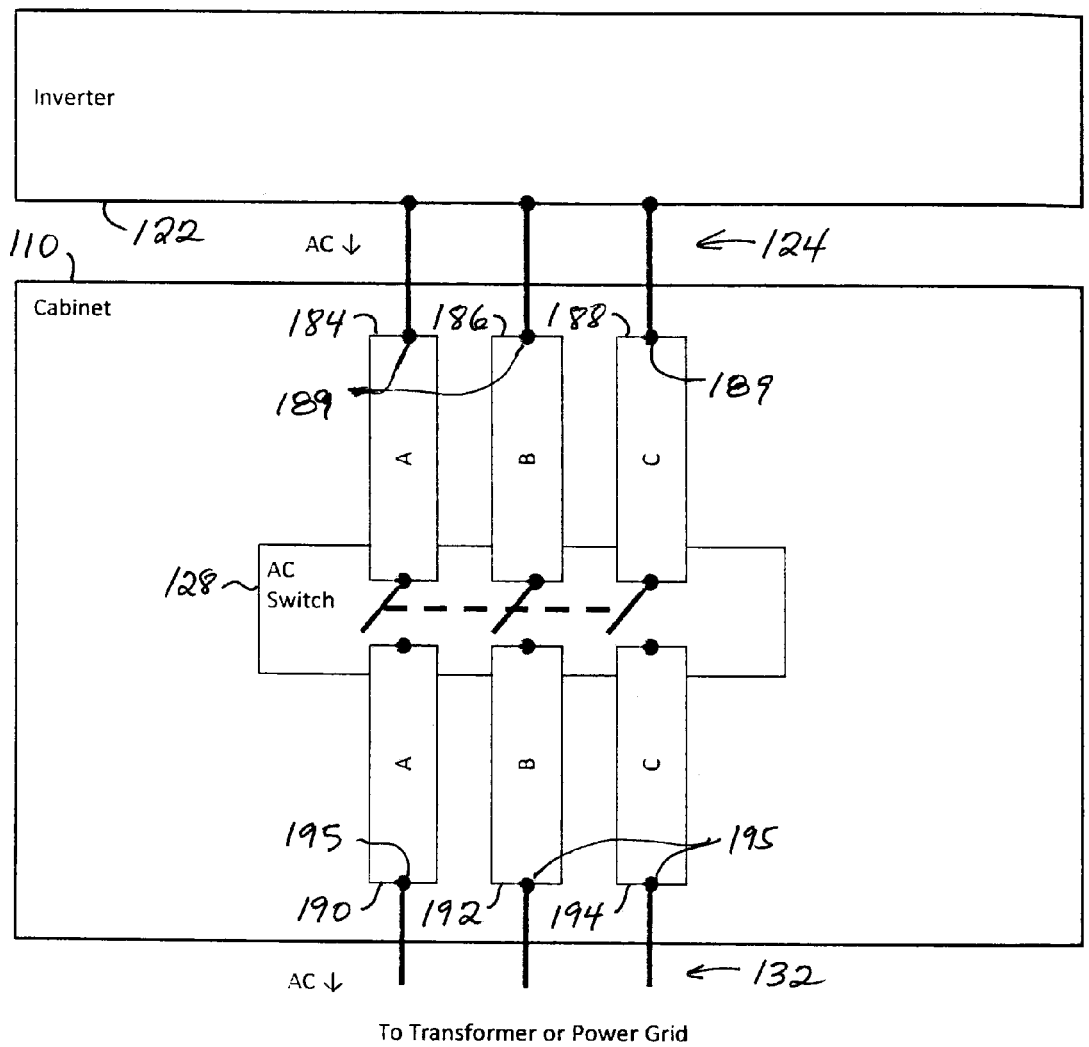
FIG. 9 is a block diagram of an exemplary configuration within an AC side of the electrical cabinet of FIG. 1
Figure 10A:
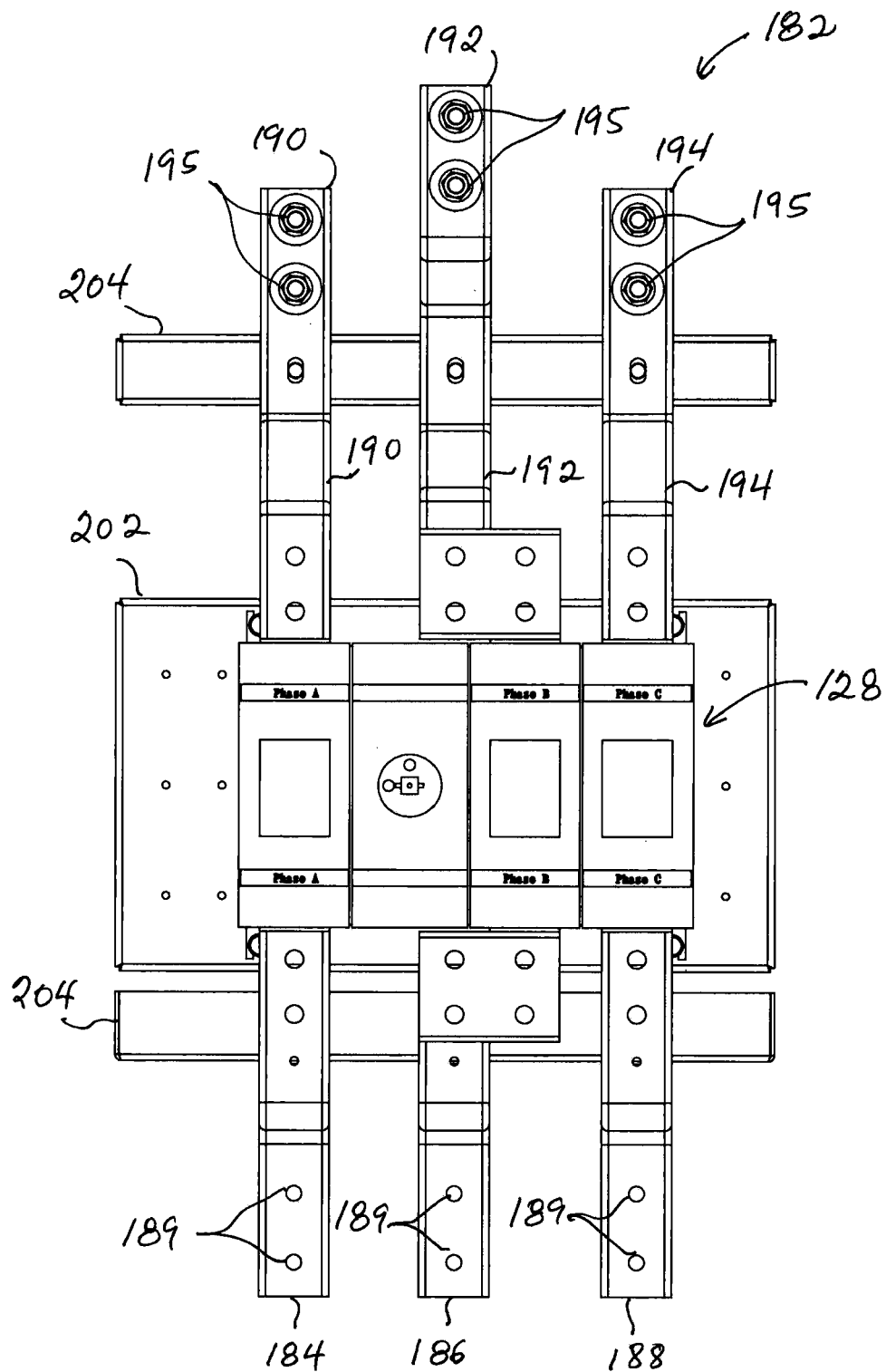
FIGS. 10A and 10B are front and perspective views of an exemplary AC busbar assembly within the electrical cabinet of FIG. 1 corresponding to the configuration of FIG. 9.
Figure 10B:
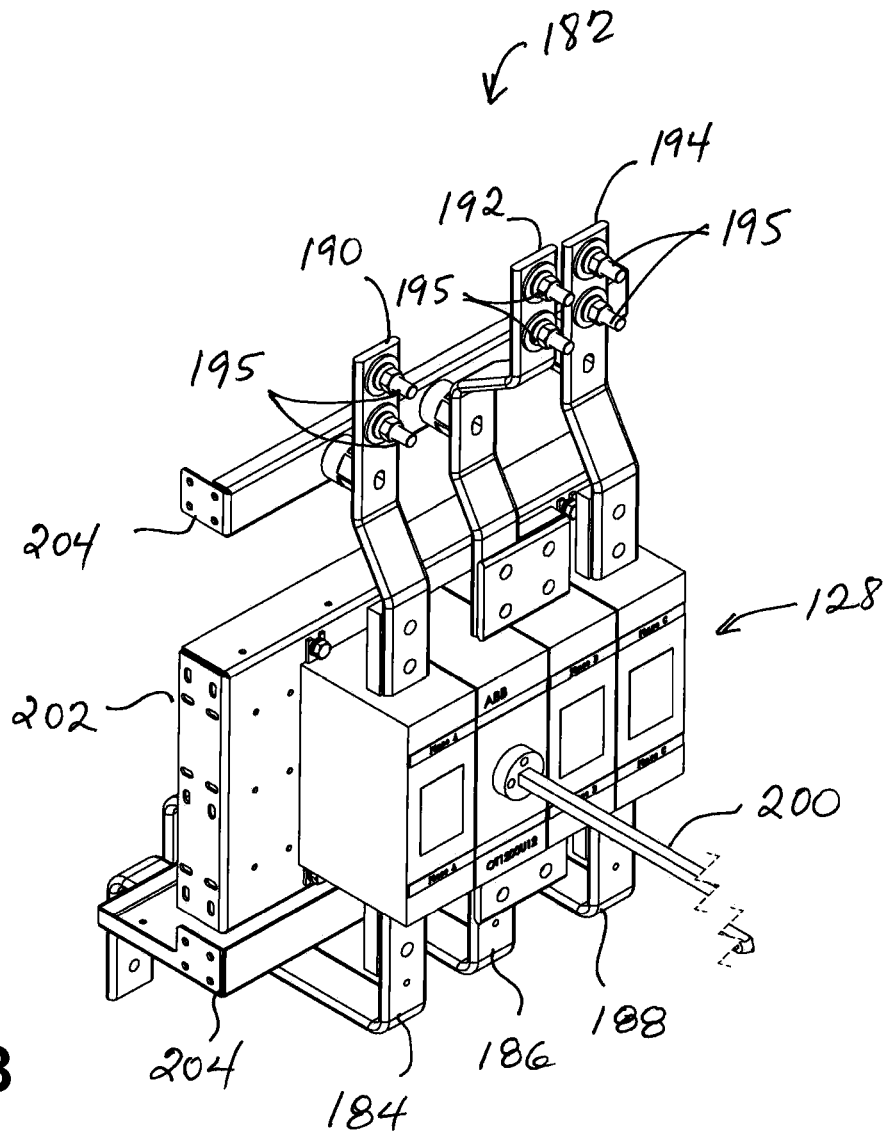

FIG. 9 shows exemplary electrical connections for receiving AC power from invertor 122. FIGS. 10A and 10B show exemplary AC busbar assembly 182 that can be implemented for the electrical connections of FIG. 9.

In some embodiments, the AC power received by cabinet 110 is from a unipolar- or monopolar-type invertor delivering three-phase AC power. In other embodiments, the AC power is received from a bipolar-type invertor delivering three-phase AC power.

Cabinet 110 has a DC side and an AC side separated by a wall from the DC side. The AC side contains a group of AC-in busbars including A-phase busbar 184, B-phase busbar 186, and C-phase busbar 188, all of which are electrically isolated from each other. Cable 124 electrically connects the AC-in busbars to invertor 122.

In some embodiments, cable 124 is replaced by AC busbars of invertor 122.

Each of the AC-in busbars optionally includes one or more connection points 189 for connecting to cable 124 or to AC busbars of invertor 122. Each connection point 189 can be a connection post or a connection hole. A connection post can be a bolt or tab protruding from the body of the AC-in busbar. A connection hole can be through hole, side cut, or perforation formed in the body of the AC-in busbar.

The AC side contains a group of AC-out busbars including second A-phase busbar 190, second B-phase busbar 192, and second C-phase busbar 194, all of which are electrically isolated from each other. Cable 132 electrically connects the AC-out busbars to a transformer, other device, or power grid. Each one of the AC-out busbars optionally includes one or more connection points 195 for connecting to cable 132. Each connection point 195 can be a connection post or a connection hole. A connection post can be a bolt or tab protruding from the body of the AC-out busbar. A connection hole can be through hole, side cut, or perforation formed in the body of the AC-out busbar.

The AC side contains AC switch assembly 128 configured to simultaneously: electrically connect A-phase busbar 184 to second A-phase busbar 190; electrically connect B-phase busbar 186 to second B-phase busbar 192; electrically connect C-phase busbar 188 to second C-phase busbar 194; and keep A-phase busbar 184, B-phase busbar 186, and C-phase busbar 188 electrically isolated from each other. When AC switch assembly 128 is in an open state, all busbars mentioned in this paragraph are electrically isolated from each other.

AC switch assembly 128 can be manually actuated by a person via a switch lever that includes handle 198 (FIG. 1) accessible from outside cabinet 110. Coupling 200 operatively connects handle 198 to AC switch assembly 128 inside cabinet 110.

As shown in FIGS. 10A and 10B, AC busbar assembly 182 includes base 202 for securing AC switch assembly 128 to cabinet 110, and support brackets 204 for keeping the AC-in busbars and AC-out busbars spaced apart and electrically isolated from each other.

In the DC busbar assemblies previously discussed, one terminal of fuse 112 is connected to fuse connection terminal 152 of standoff device 150 while the opposite terminal of fuse 112 is connected to first busbar 114*a* or second busbar 114*b*.

Figure 11:
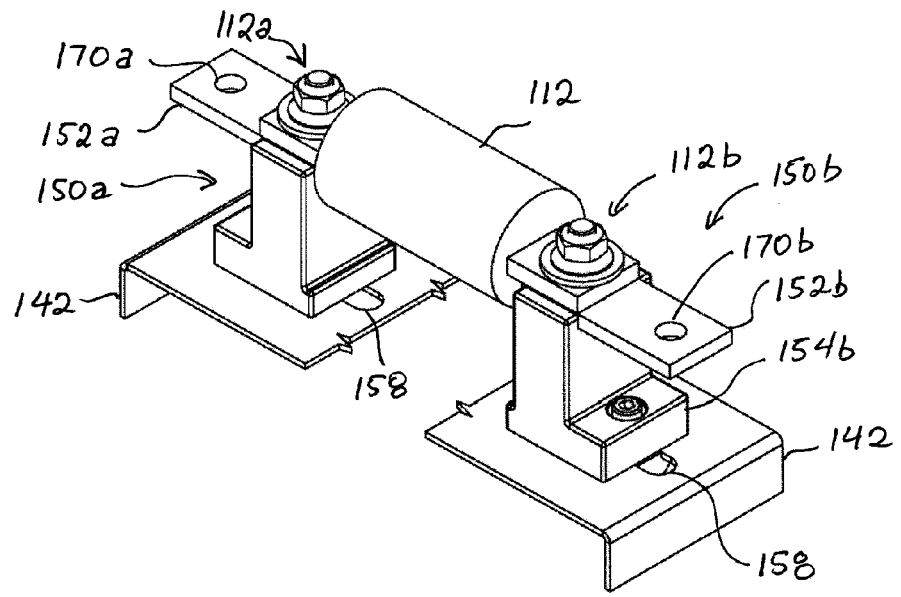
FIGS. 11 and 12 are perspective views of exemplary fuse installation configurations for use in any of the DC busbar assemblies.
Figure 12:
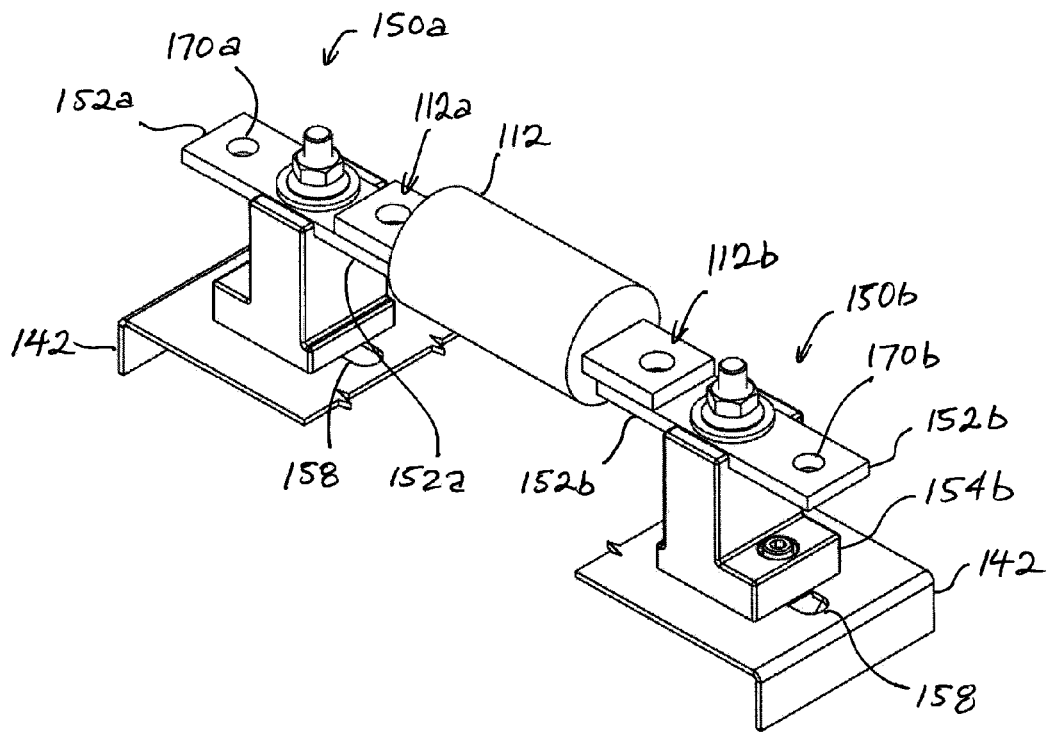

FIGS. 11 and 12 show exemplary fuse installation configurations in which one terminal 112*a* of fuse 112 is secured to and electrically connected to fuse connection terminal 152*a* of a first standoff device 150*a*. In some embodiments, connection point 170*a* on fuse connection terminal 152*a* connects to a power line from combiner box 104.

Opposite terminal 112*b* of fuse 112 is secured to and electrically connected to fuse connection terminal 152*b* of second standoff device 150*b*. In some embodiments, connection point 170*b* on fuse connection terminal 152*b* may connect to first busbar 114*a* or second busbar 114*b*.

Figure 13:
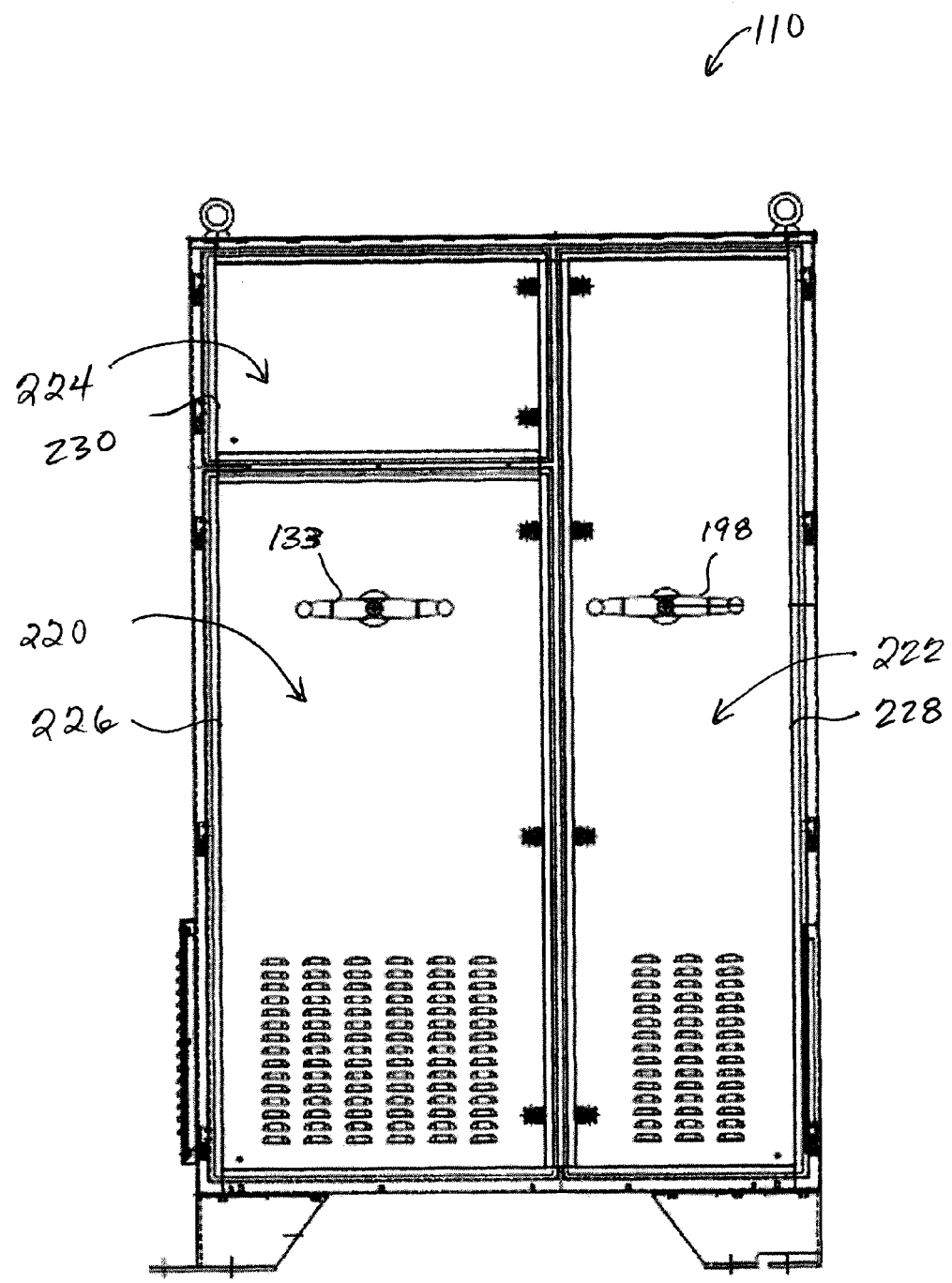
FIGS. 13 and 14 are front elevation views of an exemplary cabinet for housing any of the configurations, assemblies, and devices of FIGS. 1-12.
Figure 14:
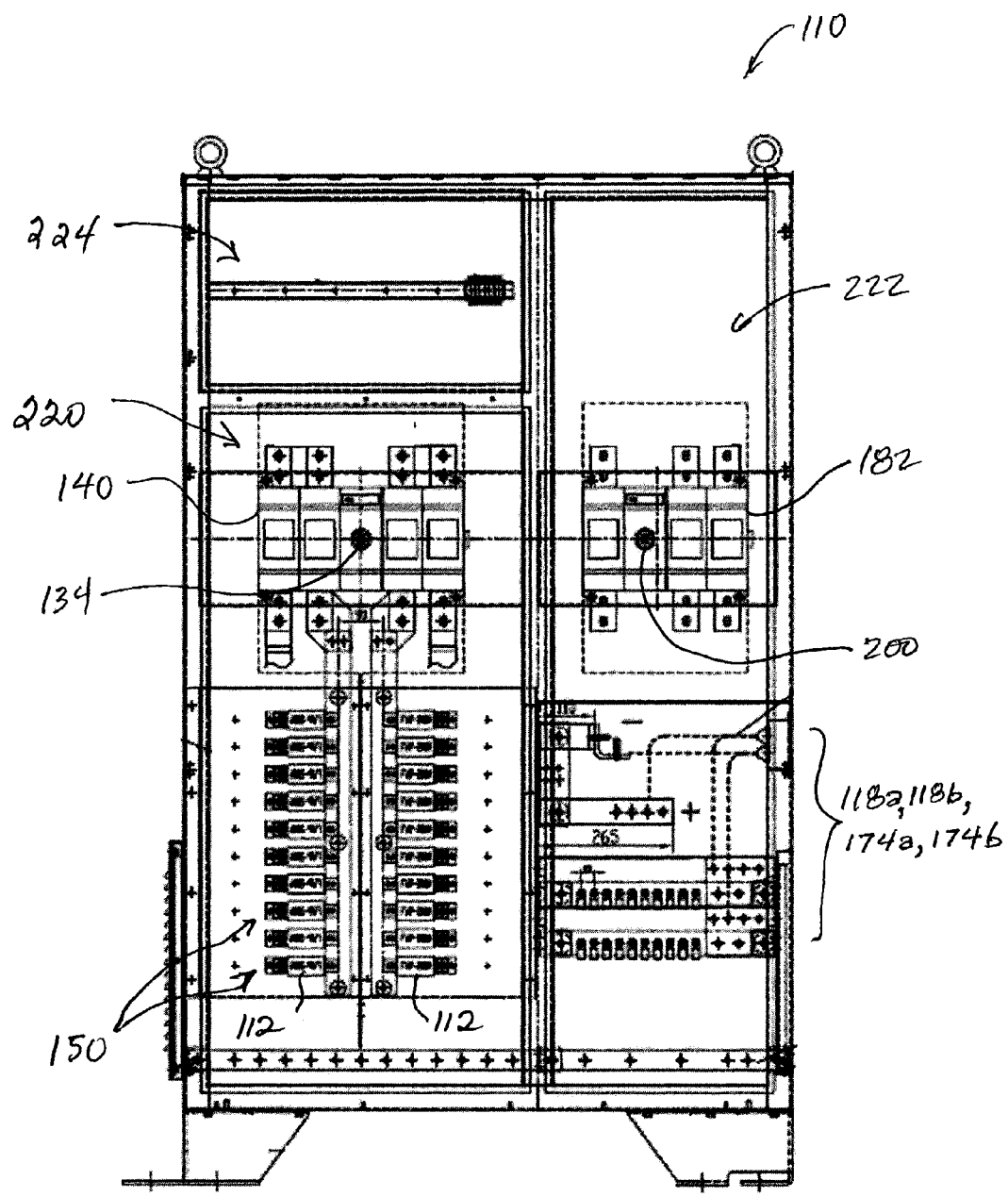

FIGS. 13 and 14 show an exemplary cabinet 110 which can be used to house any one or a combination of the busbar assemblies and fuse standoff devices described in the preceding figures. Cabinet 110 includes DC compartment 220, AC compartment 222, and optional compartment 224. DC compartment 220 is accessible through hinged door 226 and contains DC busbar assembly 140, 180. AC compartment 222 is accessible through hinged door 228 and contains AC busbar assembly 182. Compartment 224 is accessible through hinged door 330 and may contain optional communications and monitoring equipment of the photovoltaic system. Compartment 224 is electrically isolated from and substantially shielded from electromagnetic interference from DC compartment 220, AC compartment 222, and/or invertor 122. FIG. 14 shows doors 226, 228, 230 removed for clarity of illustration.

In alternative embodiments, cabinet 110 does not have compartment 224.

As shown in FIG. 13, switch handle 133 is mounted on door 226 of DC compartment 220. When door 226 is closed, switch handle 133 becomes engaged with coupling 134 which is operatively connected to DC switch assembly 116. When door 226 is opened, switch handle 133 becomes disengaged from coupling 134. Switch handle 198 is mounted on door 228 of AC compartment 222. When door 228 is closed, switch handle 198 becomes engaged with coupling 200 which is operatively connected to AC switch assembly 128. When door 228 is opened, switch handle 198 becomes disengaged from coupling 200.

As shown in FIG. 14, the lower portion of AC compartment 222 contains the free ends of invertor busbars 118a, 118b of DC busbar assembly 140, 180 and optionally the free ends of neutral busbars 174a, 174b.

Figure 15:
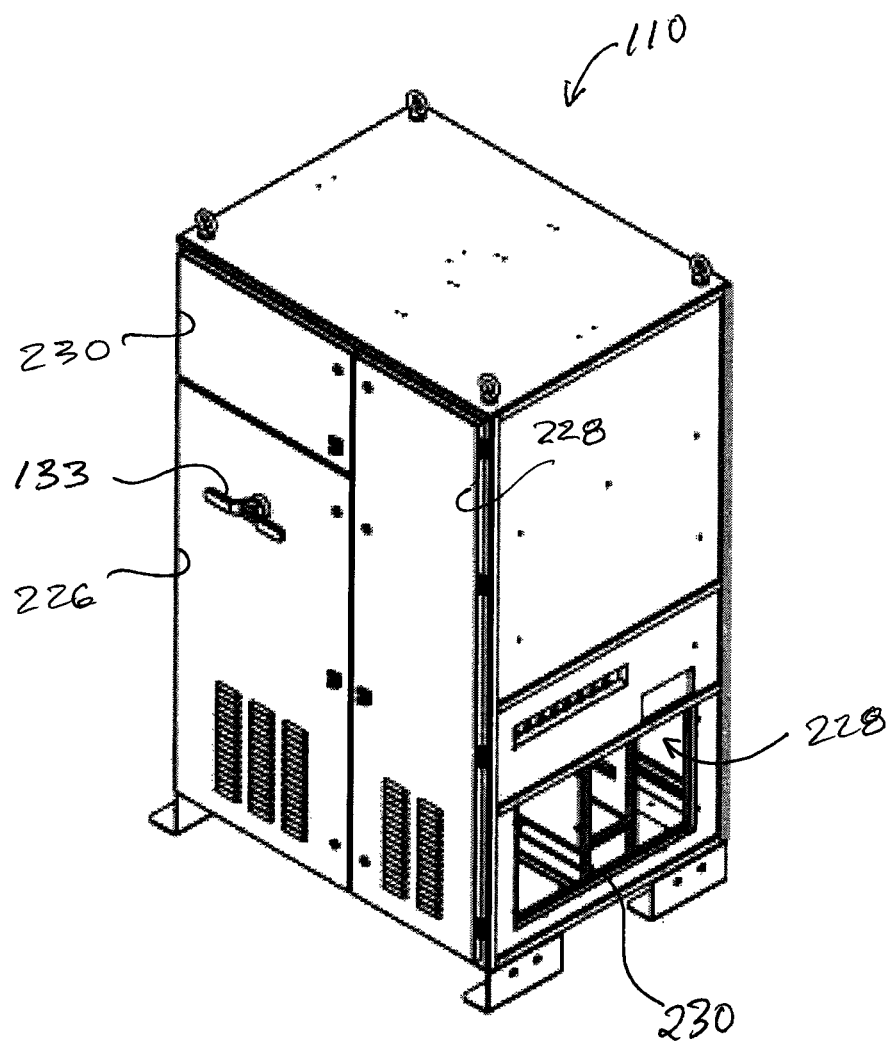
FIG. 15 is a perspective view of an exemplary cabinet for housing any of the configurations, assemblies, and devices of FIGS. 1-12.

FIG. 15 shows an alternative embodiment of cabinet 110 which contains an AC busbar assembly having no AC switch assembly. Thus, cabinet 110 of FIG. 15 does not have a switch handle mounted on door 228.

One side of AC compartment 228 includes opening 230 near the bottom of cabinet 110. Invertor 122 (not shown in FIG. 15) may be placed immediately adjacent to opening 230 to allow for a more direct and compact electrical connection to the free ends of invertor busbars 118a, 118b of DC busbar assembly 140, 180 and optionally the free ends of neutral busbars 174a, 174b. With such connections, there will be no cables between invertor 122 and the invertor busbars 118a, 118b and neutral busbars 174a, 174b.

In alternative embodiments, invertor 122 is spaced apart from cabinet 110. A cover, such as a ventilated grill, may be secured over opening 230.

FIG. 16 shows an exemplary table of specifications for cabinet 110. All busbars described above are made of a flat strip or bar of conductive material, such as metal, and particularly copper. Other suitable materials include aluminum and brass. The busbars can be plated to resist corrosion. Each of the busbars has a cross-section sized to carry the voltages shown in FIG. 16 and associated electrical current. In some embodiments, the busbars can have a cross-sectional width of at least 40 mm or a width of about 50 mm, in combination with a thickness of at least 3 mm or a cross-sectional thickness of about 5 mm.

It will be appreciated that various embodiments of the present invention allow for integration of AC and DC switching components and fuses for a photovoltaic system into a compact space and allow for flexibility in configuration to enable the user to select various commercially available switches and fuses. It will be appreciated that the busbar assemblies of the present invention increase reliability and allow for considerable savings in configuration and installation labor as compared to conventional connections between standalone and discrete BOS components.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. An electrical cabinet comprising:
a base;
a busbar mounted on the base;
a plurality of standoff devices spaced apart from the busbar, each standoff device including a standoff member slideably mounted on the base and a fuse connection terminal, each fuse connection terminal spaced apart from the other fuse connection terminals; and
a cover containing the base, the busbar, and the standoff devices.

2. The cabinet of claim 1, wherein each standoff member includes a foot portion abutting the base, each standoff device further includes a retainer having body portion and a shoulder portion connected to and wider than the body portion, the body portion extends through the base and connects the shoulder portion to the foot portion, and the body portion is configured to allow movement of the shoulder portion toward or away from the base.

3. The cabinet of claim 2, wherein each standoff device includes a threaded member connecting the retainer to the foot portion of the standoff member, the threaded member is rotatable relative to the foot portion, and rotation of the threaded member in one direction causes the retainer to move toward or away from the foot portion.

4. The cabinet of claim 1, wherein each fuse connection terminal includes a plurality of connection points, each connection point being a connection hole or a connection post.

5. The cabinet of claim 1, wherein the base includes a plurality of slots, each slot holding one of the standoff members, the slots sized and oriented to allow the standoff members to move toward and away from the busbar.

6. The cabinet of claim 1, wherein the busbar includes a plurality of connection holes or connection posts.

7. The cabinet of claim 1, further comprising an invertor busbar contained within the cover, wherein all parts of the invertor busbar are spaced apart from the busbar.

8. The cabinet of claim 7, further comprising an electrical switch assembly contained within the cover and configured to electrically connect the busbar to the invertor busbar.

9. The cabinet of claim 8, further comprising switch lever having a handle and a coupling, the handle disposed outside the cover, the coupling connecting the handle to the switch assembly.

10. The cabinet of claim 1, further comprising a second busbar mounted on the base, wherein the base includes a first row of slots and a second row of slots, each slot holding one of the standoff members, the slots sized and oriented to allow the standoff members to move toward and away from the first and second busbars, either one or both of the busbar and the second busbar being disposed between the first row of slots and a second row of slots.

11. The cabinet of claim 10, further comprising a non-conductive plate disposed between the busbar and the second busbar.

12. The cabinet of claim 10, further comprising an invertor busbar mounted to the base and a second invertor busbar mounted to the base, wherein within the cover, the busbar, second busbar, invertor busbar, and second invertor busbar are electrically isolated from each other.

13. The cabinet of claim 12, wherein the base includes a front side and a rear side, wherein the busbar, the second busbar, and the fuse connection terminals of the standoff devices are located on the front side, and wherein the invertor busbar and the second invertor busbar are located on the rear side.

14. The cabinet of claim 12, further comprising an electrical switch assembly contained within the cover, the switch assembly configured to simultaneously electrically connect the busbar to the invertor busbar, electrically connect the second busbar to the second invertor busbar, and electrically isolate the busbar and the invertor busbar from the second busbar and the second invertor busbar.

15. The cabinet of claim 12, further comprising a neutral busbar and a second neutral busbar, both of which are contained within the cover, wherein within the cover, the busbar, the second busbar, the invertor busbar, the second invertor busbar, the neutral busbar, and the second neutral busbar are electrically isolated from each other.

16. The cabinet of claim 15, wherein the neutral busbar includes a plurality of connection holes or connection posts, and the second neutral busbar includes a plurality of connection holes or connection posts.

17. The cabinet of claim 1, further comprising an A-phase busbar, a B-phase busbar, and a C-phase busbar, all of which are contained within the cover and are electrically isolated from each other within the cover.

18. The cabinet of claim 17, further comprising a second A-phase busbar, a second B-phase busbar, and a second C-phase busbar, all of which are contained within the cover and are electrically isolated from each other within the cover.

19. The cabinet of claim 18, further comprising an AC switch assembly contained within the cover, the AC switch assembly configured to simultaneously electrically connect the A-phase busbar to the second A-phase busbar, electrically connect the B-phase busbar to the second B-phase busbar, electrically connect the C-phase busbar to the second C-phase busbar, and keep the A-phase busbar, the B-phase busbar, and the C-phase busbar electrically isolated from each other.

20. The cabinet of claim 19, further comprising an AC switch lever having a handle and a coupling, the handle disposed outside the cover, the coupling connecting the handle to the AC switch assembly.

\* \* \* \* \*